United States Patent
Jouanneau-Si Larbi et al.

(10) Patent No.: US 7,914,929 B2
(45) Date of Patent: Mar. 29, 2011

(54) AQUEOUS DISPERSION WITH A STARCH AND LITHIUM AND TITANIUM MIXED OXIDE BASE FOR A LITHIUM STORAGE BATTERY ELECTRODE

(75) Inventors: Séverine Jouanneau-Si Larbi, Saint Quentin sur Isere (FR); Gunay Yildirim, Saint Martin d'Heres (FR)

(73) Assignee: Commissariat a l'Energie Atomique, Paris (FR)

( * ) Notice: Subject to any disclaimer, the term of this patent is extended or adjusted under 35 U.S.C. 154(b) by 971 days.

(21) Appl. No.: 11/806,399

(22) Filed: May 31, 2007

(65) Prior Publication Data
US 2007/0298321 A1 Dec. 27, 2007

(30) Foreign Application Priority Data
Jun. 26, 2006 (FR) ...................................... 06 05709

(51) Int. Cl.
*H01M 4/62* (2006.01)

(52) U.S. Cl. ......................................................... 429/217
(58) Field of Classification Search .................... None
See application file for complete search history.

(56) References Cited

U.S. PATENT DOCUMENTS

| 3,877,983 A | 4/1975 | Hovsepian |
| 6,475,673 B1 | 11/2002 | Yamawaki et al. |
| 2002/0127471 A1 | 9/2002 | Siret et al. |

FOREIGN PATENT DOCUMENTS

| EP | 1 221 730 A1 | 7/2002 |
| EP | 1 655 798 A1 | 5/2006 |

*Primary Examiner* — Robert Hodge
(74) *Attorney, Agent, or Firm* — Oliff & Berridge, PLC

(57) ABSTRACT

A dispersion comprises at least one aqueous solvent, a lithium and titanium mixed oxide such as $Li_4Ti_5O_{12}$ and an organic binder comprising a starch-type polysaccharide. The starch-type polysaccharide comprises amylose and amylopectin, with a ratio between the weight proportion of amylose and the weight proportion of amylopectin that is less than or equal to 25%. Such a dispersion can be used to achieve a lithium storage battery electrode.

9 Claims, No Drawings

AQUEOUS DISPERSION WITH A STARCH AND LITHIUM AND TITANIUM MIXED OXIDE BASE FOR A LITHIUM STORAGE BATTERY ELECTRODE

BACKGROUND OF THE INVENTION

The invention relates to a dispersion for a lithium storage battery electrode comprising at least an aqueous solvent, a lithium and titanium mixed oxide and an organic binder.

The invention also relates to the use of the dispersion in a production method of a lithium storage battery electrode.

STATE OF THE ART

Lithium storage batteries are being increasingly used as autonomous energy sources. More particularly, they are tending to progressively replace nickel-cadmium (NiCd) and nickel-metallic hydride (NiMH) type storage batteries in mobile equipment. This is partly due to their energy density which is much greater than that of NiCd and NiMH storage batteries.

The active materials used to form the positive electrode of a lithium storage battery are mainly $LiCoO_2$, $LiNiO_2$, mixed oxides $Li(Ni, Co, Mn, Al)O_2$, $LiMn_2O_4$ or compounds of spinel structure with a composition close to $LiMn_2O_4$ or of olivine structure of $LiFePO_4$ type.

For the negative electrode, the main materials used are metallic lithium, a lithium-based alloy, a nanodispersion of a lithium alloy in a lithium and transition metal oxide and a mixed lithium and titanium oxide of $Li_xTi_yO_4$ type, with $0.8 \leq x \leq 1.4$ and $1.6 \leq y \leq 2.2$.

For the above-mentioned mixed lithium and titanium oxides, lithium and titanium oxide $Li_4Ti_5O_{12}$, also called lithium titanate, is currently considered to be a very promising material to form a negative electrode active material, in particular for applications requiring high powers. It does in fact have a high lithium intercalation capacity as it is able to insert 3 $Li^+$ cations per unit. It also has a good cycling behaviour. Finally, it can be charged and discharged rapidly at high current, in particular because it presents an operating potential (1.5 V with respect to the potential of the $Li^+/Li$ couple) favoring use thereof with any type of liquid electrolyte.

Moreover, lithium storage battery electrodes are in general made by adding an electronically conducting element such as carbon and an organic binder such as polyvinylidene fluoride (PVDF), the polyvinylidene fluoride and hexafluoropropylene (PVDF-HFP) copolymer or polyethylene oxide (PEOX) to the active material. These different elements are generally dispersed in suspension in an organic solvent such as N-methyl-pyrrolidone or acrylonitrile. These solvents are however very toxic and relatively costly. Moreover, as such organic solvents are harmful for the environment, large-scale electrode production requires set-up and implementation of elaborate and expensive methods for removing the organic solvents.

To produce a lithium storage battery electrode with a lithium and titanium mixed oxide base of general formula $Li_xTi_yO_4$, with $0.8 \leq x \leq 1.4$ and $1.6 \leq y \leq 2.2$, patent application EP-A-1221730 proposes to use an organic binder compatible with aqueous solvents. More particularly, the organic binder is a non-fluorinated polymer, soluble in water or forming a stable emulsion when dispersed in suspension in water. The binder preferably comprises an elastomer such as a styrene/butadiene copolymer (SBR) and or a cellulosic compound such as a carboxymethyl cellulose (CMC) with a mean molecular weight of more than 200.000. Such a binder is however not completely satisfactory.

More particularly, the use of CMC can give rise to a decrease in the performances of the active material of the electrode. For electrodes with a high basis weight, it can also give rise to a large retraction phenomenon when drying of the suspension takes place and therefore when the water evaporates. CMC is in fact a semi-synthetic water-soluble polymer, derived from cellulose. It is formed by several hundred units of glucose on which —$CH_2COOH$ groups are substituted. The very long polymer chains of CMC do however present the drawback of being highly covering. They therefore completely wet the active material grains, which results in a decrease in the performances of said material and occurrence of the retraction phenomenon when drying takes place. In addition, CMC in solution comprises numerous —OH, O$^-$ and —OH$^-$ terminations. The —OH$^-$ termination can form hydrofluoric acid (HF) with the fluorine present in the electrolyte salt, or lithium or sodium hydroxide with the lithium or sodium present in the electrolyte salt.

SBR is a plasticizing polymer. Used on its own, carbon has difficulty in dispersing homogeneously in the solution. Moreover, SBR does not present a thickening function. The binder obtained is then too liquid and coating of the electrode is difficult to control.

OBJECT OF THE INVENTION

The object of the invention is to achieve a dispersion for a lithium storage battery electrode remedying the shortcomings of the prior art. More particularly, the object of the invention is to achieve a dispersion enabling a lithium storage battery electrode to be achieved that is homogeneous, has good electrochemical performances and presents good mechanical properties while at the same time preserving the environment.

According to the invention, this object is achieved by the accompanying claims.

DESCRIPTION OF PARTICULAR EMBODIMENTS

A lithium storage battery electrode is achieved from a dispersion comprising at least an aqueous solvent such as water, a lithium and titanium mixed oxide and an organic binder.

The lithium and titanium mixed oxide is of $Li_xTi_yO_4$ type with $0.8 \leq x \leq 1.4$ and $1.6 \leq y \leq 2.2$. More particularly, the lithium and titanium mixed oxide is $Li_4Ti_5O_{12}$ or a derivative of $Li_4Ti_5O_{12}$ such as compounds selected among $Li_{4-x'}M_{x'}Ti_5O_{12}$ and $Li_4Ti_{5-y'}N_{y'}O_{12}$ with x' and y' comprised between 0 and 0.2 and M and N respectively being chemical elements selected among Na, K, Mg, Nb, Al, Ni, Co, Zr, Cr, Mn, Fe, Cu, Zn, Si and Mo. The weight proportion of lithium and titanium mixed oxide in the dispersion is preferably comprised between 80% and 98%.

The organic binder comprises a starch-type polysaccharide. More particularly, the weight proportion of starch-type polysaccharide in the dispersion is comprised between 0.1% and 5% and more particularly between 0.2% and 5%.

In a general manner, starch is a reserve polysaccharide having the general chemical formula $(C_6H_{10}O_5)_n$ and presenting the particularity of comprising two distinct polysaccharide fractions: amylose and amylopectin. Amylose is a linear molecule formed by about 600 glucose molecules bonded by an a-(1.4)-D-glucoside bond and amylopectin differs from amylose by the fact that it is more ramified.

The starch-type polysaccharide used in the dispersion is thus selected such that the ratio R between the weight proportion of amylose and the weight proportion of amylopectin is less than or equal to 25%. This enables a homogeneous dispersion to be obtained, i.e. a dispersion presenting a homogeneous distribution of the particles in presence, and more particularly an emulsion. When they are placed in an aqueous solution, the two polysaccharide fractions do in fact dissociate. Only amylopectin is stable in emulsion in water and a too high proportion of amylose can lead to a risk of syneresis, i.e. a non-homogeneous dispersion. In this case, the electrode produced from this non-homogeneous dispersion would itself be non-homogeneous as the syneresis phenomenon increases with drying and evaporation of water.

The dispersion can be heated slightly, for example between 60° C. and 80° C., which enables a stable and homogeneous dispersion to be preserved for several days after cooling. The starch-type polysaccharide used can also be a modified starch, for example a gel soluble in water.

Choosing a starch-type polysaccharide enables an aqueous solvent such as water to be used, which is environment protection-friendly. This moreover enables the drawbacks of the organic binder described in patent application EP-1221730 to be remedied and in particular by preventing a decrease in the performances and retraction when drying takes place. A starch-type polysaccharide does in fact present less $OH^-$ terminations and the chains are shorter than for CMC.

The binder can also comprise an additional compound presenting at least the plasticizer function. It is for example selected among elastomer compounds and polyelectrolyte compounds. The additional compound is for example a styrene/butadiene (SBR) copolymer, a polyvinyl acetate (PVA), a polyvinyl-pyrrolidone (PVP), or a polyethylene oxide (PEOX). The weight proportion of the additional compound in the dispersion is more particularly less than or equal to 7% and more particularly less than or equal to 4%.

The dispersion can also comprise an electronically conducting compound such as graphite carbon or coke. The weight proportion of the electronically conducting compound in the dispersion is preferably comprised between 0.5% and 10% in weight.

For example, a dispersion is prepared by mixing 90% of lithium titanate $Li_4Ti_5O_{12}$, 4% of a starch-type polysaccharide presenting a ratio R=0.20 and water. 5% of electronically conducting carbon black is then added to the previously obtained mixture and the whole is mixed together for 5 minutes. The viscosity of the mixture can be adjusted by adding water, in a proportion of 45% of dry extract. An additional water-soluble compound such as PVA is then added to the mixture in a proportion of 1% so as to obtain an ink. The ink thus obtained can be spread in a coating on an aluminium current collector with a micrometric caliper blade. After a step of drying in the ambient air for 15 minutes in which the starch is dissociated into its two polysaccharide functions, followed by baking in an oven at 55° C. for 24 hours, the current collector coated with said ink forms an electrode able to be used in a lithium storage battery.

A lithium storage battery of Li-Metal type is for example achieved using the electrode fabricated above as positive electrode, a negative electrode made of metallic lithium and a separator imbibed with liquid electrolyte formed by $LiPF_6$ (1M) in solution in propylene carbonate. At 25° C., such a storage battery enables 3 $Li^+$ cations to be exchanged, with a substantially constant operating voltage equal to 1.55 V compared with the $Li^+/Li$ couple. The specific capacity obtained is 160 mAh/g under C/10 conditions. The dispersion produced above thus enables a homogeneous electrode to be obtained that has good electrochemical performances and presents good mechanical properties.

Likewise, a lithium storage battery of Li-ion type can be achieved using the electrode fabricated above as negative electrode, a $LiFePO_4$-base positive electrode and a separator imbibed with liquid electrolyte formed by $LiPF_6$ (1M) in solution in propylene carbonate. The electrodes are positioned in such a way as to have 3 moles of $LiFePO_4$ for one mole of $Li_4Ti_5O_{12}$, which enables 100% of the storage capacity of the active material of the negative electrode to be used. Such a storage battery operates at a voltage of 1.9V.

The electrolyte can be any type of salt containing a $Li^+$ cation and placed in solution in an aprotic solvent. For example, the salt can be $LiClO_4$, $LiAsF_6$, $LiPF_6$, $LiBF_4$, $LiCH_3SO_3$ and the aprotic solvent can be ethylene carbonate, propylene carbonate, dimethyl carbonate, diethyl carbonate, or methyl carbonate.

The invention is not limited to the embodiments described above. For example, to form an electrode, a dispersion according to the invention can be spread, printed or coated on a current collector. A Li/Ion storage battery comprising a negative electrode made from a dispersion according to the invention can comprise any type of known positive electrode material. The positive electrode material can for example be $LiFePO_4$ or $LiMn_2O_4$ or $LiNi_{0.5}Mn_{1.5}O_4$.

The invention claimed is:

1. A dispersion for a lithium storage battery electrode comprising:
   at least an aqueous solvent, a lithium and titanium mixed oxide and an organic binder, wherein the organic binder comprises a starch-type polysaccharide comprising amylose and amylopectin, the ratio between the weight proportion of amylose and the weight proportion of amylopectin being less than or equal to 25%.

2. The dispersion according to claim 1, wherein the weight proportion of starch-type polysaccharide in the dispersion is comprised between 0.1% and 5%.

3. The dispersion according to claim 1, wherein the weight proportion of lithium and titanium mixed oxide in the dispersion is comprised between 80% and 98%.

4. The dispersion according to claim 1, comprising an electronically conducting compound.

5. The dispersion according to claim 4, wherein the weight proportion of electronically conducting compound in the dispersion is comprised between 0.5 and 10%.

6. The dispersion according to claim 1, wherein the organic binder comprises at least one additional compound selected from the group consisting of elastomer compounds and polyelectrolyte compounds.

7. The dispersion according to claim 6, wherein the additional compound is selected from the group consisting of a styrene/butadiene copolymer, a polyvinyl acetate, a polyvinyl pyrrolidone and a polyethylene oxide.

8. The dispersion according to claim 7, wherein the weight proportion of additional compound in the dispersion is less than or equal to 7%.

9. A method for producing a lithium storage battery electrode comprising:
   spreading, printing, or coating the dispersion according to claim 1 on a current collector.

* * * * *